United States Patent
Kawasumi

(10) Patent No.: US 9,638,992 B2
(45) Date of Patent: May 2, 2017

(54) ILLUMINATION OPTICAL SYSTEM AND IMAGE PROJECTION APPARATUS

(71) Applicant: CANON KABUSHIKI KAISHA, Tokyo (JP)

(72) Inventor: Takehito Kawasumi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 14/707,325

(22) Filed: May 8, 2015

(65) Prior Publication Data

US 2015/0338729 A1    Nov. 26, 2015

(30) Foreign Application Priority Data

May 20, 2014  (JP) ................................ 2014-104066

(51) Int. Cl.
| | |
|---|---|
| G03B 21/28 | (2006.01) |
| F21V 7/00 | (2006.01) |
| H04N 9/31 | (2006.01) |
| G03B 21/00 | (2006.01) |
| G03B 21/20 | (2006.01) |

(52) U.S. Cl.
CPC ............ G03B 21/28 (2013.01); F21V 7/0091 (2013.01); G03B 21/008 (2013.01); G03B 21/208 (2013.01); H04N 9/3152 (2013.01); H04N 9/3164 (2013.01)

(58) Field of Classification Search
CPC .... G03B 21/008; G03B 21/28; G03B 21/208; G03B 21/2013
See application file for complete search history.

(56) References Cited

U.S. PATENT DOCUMENTS

| | | | | |
|---|---|---|---|---|
| 6,139,156 A | * | 10/2000 | Okamori | G02B 27/0927 348/E9.027 |
| 6,443,576 B1 | | 9/2002 | Nishida et al. | |
| 2002/0036833 A1 | * | 3/2002 | Miyata | G02B 26/0841 359/651 |
| 2002/0186349 A1 | * | 12/2002 | Wichner | H04N 9/315 353/29 |
| 2006/0176452 A1 | | 8/2006 | Kim et al. | |

(Continued)

FOREIGN PATENT DOCUMENTS

| | | |
|---|---|---|
| JP | 2000-267044 A | 9/2000 |
| JP | 2004-045718 A | 2/2004 |
| JP | 2014-056139 A | 3/2014 |

*Primary Examiner* — Sultan Chowdhury

(74) *Attorney, Agent, or Firm* — Fitzpatrick, Cella, Harper & Scinto

(57) ABSTRACT

The illumination optical system includes a first optical system configured to shape a light flux from a light source such that a light flux cross-sectional shape of the light flux becomes close to a rectangular shape of an illumination surface, a second optical system having an optical axis tilted with respect to a normal to the illumination surface and configured to introduce the light flux from the first optical system to the illumination surface, and a light-transmissive element having an entrance surface and an exit surface respectively forming mutually different angles with respect to the optical axis of the second optical system in a plane including the optical axis of the second optical system and the normal to the illumination surface. The light-transmissive element is disposed between the first optical system and the illumination surface.

8 Claims, 7 Drawing Sheets

(56) References Cited

U.S. PATENT DOCUMENTS

2007/0014124 A1\* 1/2007 Gerets ................ G02B 6/0006
362/560
2011/0176120 A1\* 7/2011 Geissler .............. H04N 9/3126
353/97
2011/0194076 A1 8/2011 Seo et al.
2012/0140184 A1\* 6/2012 Bruzzone ............ H04N 9/3167
353/20

\* cited by examiner

ILLUMINATION OPTICAL SYSTEM AND IMAGE PROJECTION APPARATUS

BACKGROUND OF THE INVENTION

Field of the Invention

The present invention relates to an illumination optical system that introduces a light flux from a light source to an illumination surface, and particularly to an illumination optical system suitable for an image projection apparatus in which a light modulation element such as a digital micromirror device (hereinafter referred to as a DMD) is disposed at the illumination surface.

Description of the Related Art

The image projection apparatus mentioned above introduces the light (illumination light) from the light source to the light modulation element disposed at the illumination surface and projects the light (image light) modulated by the light modulation element onto a projection surface through a projection optical system to display a projected image.

The DMD is a typical light modulation element and is generally configured to have an entirely rectangular modulation area as shown in FIG. 8A. The modulation area includes multiple square micromirrors arranged in a matrix. Each of the micromirrors is rotated about a diagonal line "d" as an axis between two rotational positions, which are an ON position and an OFF position, according to a pixel value of each pixel of image information. For example, as shown in FIG. 8B, the ON position is a position at which the micromirror is tilted by +12 degrees with respect to a modulation surface (horizontal plane in the figure) that is a planar surface on which the multiple micromirrors are arranged in the DMD, and the OFF position is a position at which the micromirror is tilted by −12 degrees with respect to the modulation surface.

The illumination optical system causes the illumination light to reach each micromirror from a direction tilted by 24 degrees with respect to a normal to the modulation surface. The micromirror at the ON position reflects the reaching illumination light in a direction (normal direction) in which the normal to the modulation surface extends. Since the projection optical system is disposed in the normal direction, the reflected light is projected onto the projection surface.

On the other hand, the micromirror at the OFF position reflects the reaching illumination light in a direction different from the normal direction to the modulation surface (that is, in a direction not traveling to the projection optical system), so that the reflected light is not projected onto the projection surface. Rotating the micromirror at high speed between the ON and OFF positions during one flame of the image information and changing a ratio of a period of time during which the micromirror is located at the ON position to a period of time during which the micromirror is located at the OFF position enables performing tone expression to display images having various tones.

The illumination optical system shapes a divergent light flux from the light source such that a cross-sectional shape of the light flux (hereinafter referred to as "a light flux cross-sectional shape") becomes close to a rectangular shape of an effective area of the DMD to enhance utilization efficiency of the light. On the illumination surface at which the DMD is disposed, an area where the light reaches (hereinafter referred to as "an illumination area") is set, in consideration of manufacturing error and position accuracy of optical elements constituting the illumination optical system, so as to have a margin around the modulation area of the DMD.

However, the illumination light introduced to the DMD from the above-described tilted (oblique) direction with respect to the normal to the modulation surface causes distortion and defocus, as shown in an upper part of FIG. 9, in an azimuth corresponding to where an incidence azimuth of the illumination light to the DMD (that is, a rotation direction of the micromirror) is projected to the illumination surface. Specifically, when seen from the normal direction to the modulation surface, the illumination light reaches the DMD from an azimuth of +45 degrees with a tilt of 24 degrees with respect to the normal to the modulation surface. With such an oblique illumination, on a section (xz section) including the azimuth of +45 degrees, an optical axis of the illumination optical system does not intersect orthogonally with the modulation surface, so that an apparent magnification of the illumination area increases.

In the upper part of FIG. 9, "a" represents a size of the illumination area on the xz section when the illumination light reaches the illumination area from a direction tilted by an angle θ with respect to the normal to the modulation surface of the DMD. In a lower part of the FIG. 9A, "b" represents a size of the illumination area in a yz section when the illumination light reaches the illumination area from a direction not tilted with respect to the normal to the modulation surface, which is defined as 1. With these representations, the size a is expressed by 1/cos θ. The tilt of the normal to the modulation surface of the DMD with respect to the optical axis of the illumination optical system causes a shift of the micromirrors in the modulation surface with respect to a focal position of the illumination optical system, which generates defocus. On the other hand, in a direction of −45 degrees, the optical axis of the illumination optical system is not tilted with respect to the normal to the modulation surface, so that the apparent magnification does not change and the defocus is not generated.

As a result, as shown in FIG. 10, the illumination area on the illumination surface is distorted from its original rectangular shape in its diagonal direction and also has a defocused portion, and thereby the illumination area has a shape like a parallelogram (rhomboid). Such a distorted illumination area is undesirable because when its oblique outline overlaps the modulation area of the DMD, part of the projected image becomes dark.

For this reason, it is necessary to secure a large margin around the illumination area so as to prevent the oblique outline of the illumination area from overlapping the modulation area of the DMD. However, such a large margin decreases the light utilization efficiency and thereby makes the projected image dark. Furthermore, the defocused portion of the illumination area has a lower illuminance as compared with a non-defocused portion, which makes part of the projected image corresponding to the defocused portion dark and thereby decreases a brightness evenness of the projected image.

Japanese Patent Laid-Open No. 2000-267044 discloses a method of correcting a rhomboidal distortion of an illumination area on an illumination surface (DMD) by forming an exit surface of an illumination optical system (rod integrator) into a rhomboidal shape. Japanese Patent Laid-Open No. 2004-45718 discloses a method of correcting a rhomboidal distortion of an illumination area by rotating and decentering at least one optical element (lens) constituting part of an illumination optical system with respect to an optical axis of the illumination optical system.

However, the method disclosed in Japanese Patent Laid-Open No. 2000-267044 causes an illumination light to obliquely reach the DMD and therefore a modulation surface of the DMD is not parallel to the exit surface of the rod integrator. As a result, defocus is still generated in a diagonal direction of a rectangular illumination area.

On the other hand, in the method disclosed in Japanese Patent Laid-Open No. 2004-45718 the rotation and decentering of the lens causes eccentric aberration, which decreases an imaging performance of the illumination optical system for the DMD. As a result, a sharpness of the illumination area decreases and thereby illuminance thereof decreases as in the defocused portion.

SUMMARY OF THE INVENTION

The present invention provides an illumination optical system which is capable, while introducing an illumination light flux obliquely to an illumination surface, of reducing distortion of an illumination area and of avoiding generation of defocus in the illumination area and decrease of a sharpness of the illumination area to enable enhancing light utilization efficiency.

The present invention provides as an aspect thereof an illumination optical system including a first optical system configured to shape a light flux from a light source such that a light flux cross-sectional shape of the light flux becomes close to a rectangular shape of an illumination surface, a second optical system having an optical axis tilted with respect to a normal to the illumination surface and configured to introduce the light flux from the first optical system to the illumination surface, and a light-transmissive element having an entrance surface and an exit surface respectively forming mutually different angles with respect to the optical axis of the second optical system in a plane including the optical axis of the second optical system and the normal to the illumination surface. The light-transmissive element is disposed between the first optical system and the illumination surface.

The present invention provides as another aspect thereof an image projection apparatus including an illumination optical system, and a light modulation element disposed at an illumination surface and configured to modulate a light flux introduced from a light source through the illumination optical system, the light modulated by the light modulation element being projected to a projection surface. The illumination optical system includes a first optical system configured to shape the light flux from the light source such that a light flux cross-sectional shape of the light flux becomes close to a rectangular shape of the light modulation element, a second optical system having an optical axis tilted with respect to a normal to the illumination surface and configured to introduce the light flux from the first optical system to the illumination surface, and a light-transmissive element having an entrance surface and an exit surface respectively forming mutually different angles with respect to the optical axis of the second optical system in a plane including the optical axis of the second optical system and the normal to the illumination surface. The light-transmissive element is disposed between the first optical system and the light modulation element.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Embodiment 1

Figure 1:
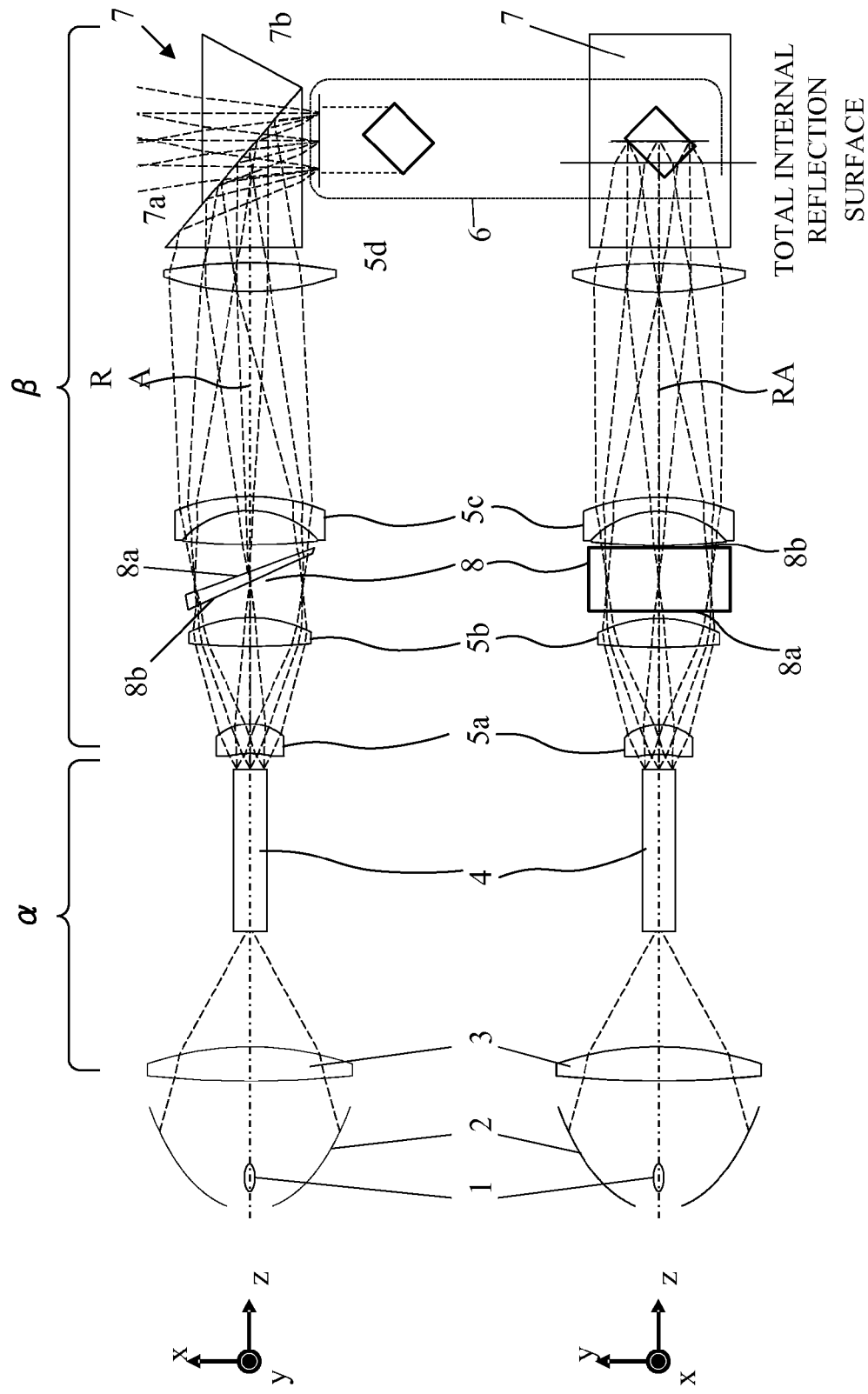
FIG. 1 shows a configuration of an image projection apparatus that is Embodiment 1 of the present invention.

FIG. 1 shows a configuration of an image projection apparatus that is a first embodiment (Embodiment 1) of the present invention. A light flux emitted from a light source 1 constituted by a discharge arc tube such as an ultra-high pressure mercury lamp is reflected by an ellipsoidal reflector 2 and then enters an illumination optical system. The illumination optical system includes a first optical system α constituted by a condenser lens 3 through which the light flux from the ellipsoidal reflector 2 passes and a rod integrator 4 through which the light flux from the condenser lens 3 passes.

The condenser lens 3 condenses the light flux from the ellipsoidal reflector 2 toward a vicinity of an entrance surface of the rod integrator 4. An axis passing through centers of the condenser lens 3 and rod integrator 4 are referred to as "an optical axis of the first optical system α". As the light source 1, other light-emitting elements than the discharge arc tube, such as an LED and a laser, may be used.

The rod integrator 4 is an optical element made of glass and having a solid rectangular columnar shape, that is, having a rectangular cross-section as a section orthogonal to the optical axis of the first optical system α. The light flux entering the rod integrator 4 from its entrance surface repeats total internal reflection inside the rod integrator 4 to form an even illumination distribution on an exit surface of the rod integrator 4.

The rod integrator 4 may be a hollow rod integrator constituted by a main body having a hollow rectangular columnar shape and reflective mirrors formed by a dielectric multilayer or a metal film vapor-deposited on four internal surfaces of the main body. Instead of the rod integrator 4, a fly-eye integrator may be used.

The illumination optical system further includes a second optical system β constituted by a relay optical system 5 and a total-internal-reflection prism 7. The light flux exiting from the exit surface of the rod integrator 4 passes through the relay optical system 5, is reflected by the total-internalreflection prism 7 and then reaches a digital micromirror device (DMD) 6 disposed at an illumination surface illuminated by the illumination optical system.

In the first optical system α, the rod integrator 4 is disposed closest to the second optical system β.

In this embodiment, the relay optical system 5 is constituted by multiple spherical lenses 5a to 5d. An axis passing through centers of these spherical lenses 5a to 5d is referred to as "an optical axis of the relay optical system 5" and further referred to as "an optical axis of the second optical system β". The relay optical system may be constituted by using at least one spherical mirror or aspheric lens. In addition, a mirror or prism reflecting light to bend the optical axis of the second optical system β may be disposed between the lenses.

The total-internal-reflection prism 7 is constituted by two prism blocks 7a and 7b arranged with an air layer therebetween. The light flux exiting from the relay optical system 5 enters the prism block 7a and is totally internally reflected at an interface between the prism block 7a and the air layer to reach the DMD 6. The reflection in the prism block 7a bends the optical axis of the second optical system β.

Figure 8A:
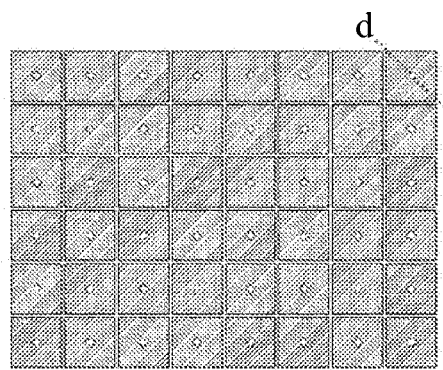
FIGS. 8A and 8B show a configuration and an operation of a conventional DMD.
Figure 8B:
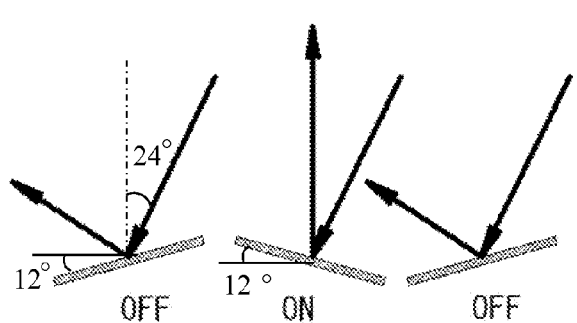

The DMD 6 is, as described with reference to FIG. 8A, the light modulation element in which in its rectangular modulation area the multiple square micromirrors are arranged in a matrix. Each micromirror is rotated about its diagonal line d, as described with reference to FIG. 8B, between the ON position tilted by +12 degrees and the OFF position tilted by −12 degrees with respect to the modulation surface that is the planar surface on which the micromirrors are arranged. The modulation surface also corresponds to a plane parallel to a substrate surface of the DMD 6 on which the rotatable micromirrors are arranged.

In this embodiment, the optical axis of the second optical system β has a tilt of 24 degrees with respect to the normal to the modulation surface of the DMD 6. In other words, the light flux (illumination light) from the second optical system β reaches the DMD 6 from a direction tilted by 24 degrees with respect to the normal to the modulation surface. Thereafter, as mentioned with reference to FIG. 8B, only a light flux reflected by the micromirror rotated at the ON position is introduced to a direction (normal direction) in which the normal to the modulation surface extends and thereby enters a projection optical system (not shown) to be projected onto a projection surface.

The modulation area of the DMD 6 in this embodiment has a rectangular shape whose aspect ratio is 16:10, and corresponding thereto, the exit surface of the rod integrator 4 is also formed in a rectangular shape whose aspect ratio is 16:10. With this configuration, the illumination light forms a rectangular illumination area approximately similar to the rectangular modulation area of the DMD 6. That is, the first optical system α is an optical system which shapes the light flux from the light source 1 such that a light flux cross-sectional shape of the light flux becomes close to the rectangular shape of the illumination surface. Providing such a first optical system α enables enhancing utilization efficiency of the light from light source 1.

Figure 9:
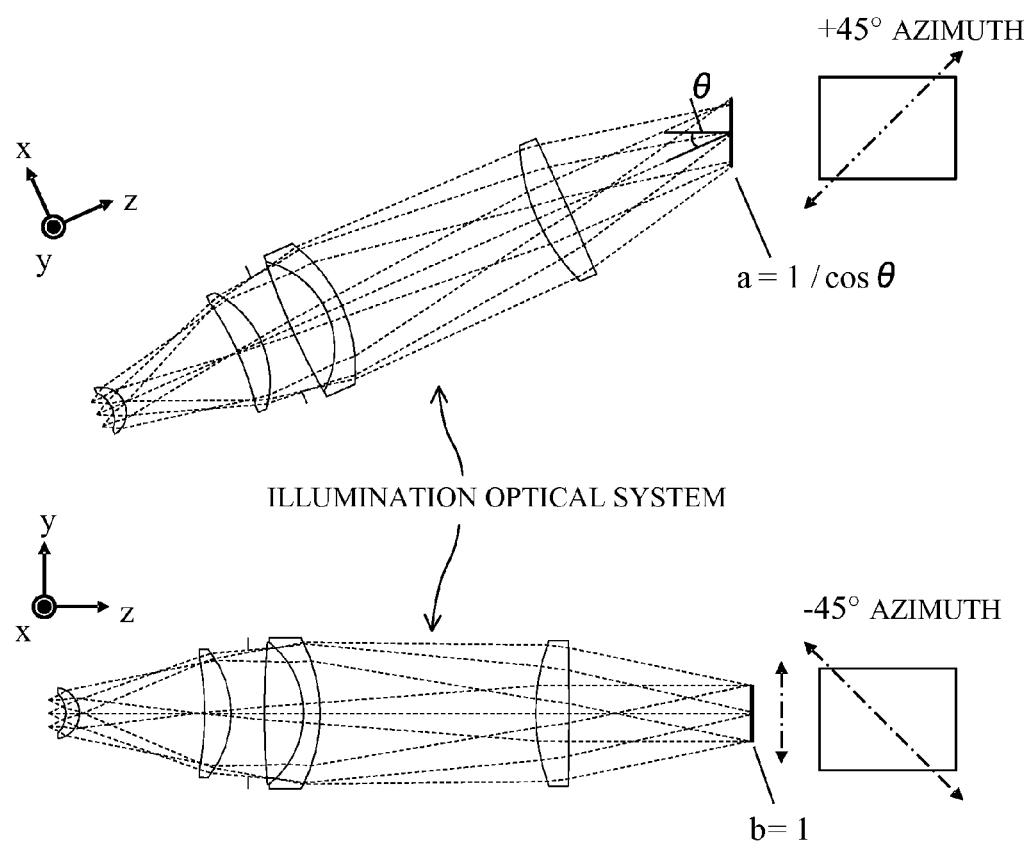
FIG. 9 shows a reason for generation of a rhomboidal distortion of an illumination area.
Figure 10:
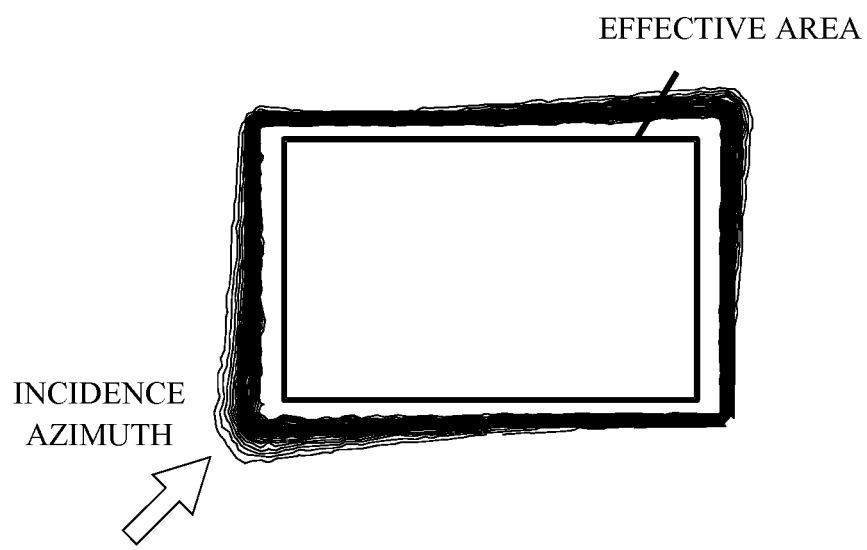
FIG. 10 shows the illumination area having the rhomboidal distortion.

However, as described with reference to FIGS. 9 and 10, the direction of the rotation of each micromirror of the DMD 6 between the ON and OFF positions is a diagonal direction of its square shape, that is, a direction tilted by 45 degrees with respect to each of four sides of the rectangular modulation area of the DMD 6. Therefore, the rectangular modulation area of the DMD 6 viewed from the normal direction to the modulation surface of the DMD 6 is tilted by 45 degrees with respect to an outline of the total-internal-reflection prism 7. In other words, the illumination light reaches the modulation area of the DMD 6 from an azimuth of +45 degrees. This oblique illumination from the 45-degree azimuth increases an apparent magnification of the illumination area in its diagonal direction to cause a rhomboidal distortion of the illumination area. Furthermore, the tilt of the normal to the modulation surface of the DMD 6 with respect to the optical axis of the second optical system β causes a displacement of the micromirrors in the modulation surface with respect to a focal position of the second optical system β, which generates defocus.

For this reason, in this embodiment, as shown in FIG. 1, a wedge-like light-transmissive element (hereinafter referred to as "a wedge element") 8 having a wedge shape is disposed between the lens 5b and the lens 5c in the relay optical system 5 (that is, in the second optical system β). The wedge element 8 may be formed of a light-transmissive material such as a general optical glass; BK7 is used in this embodiment. In the following description, of the optical axis of the second optical system β, an optical axis part of the relay optical system 5 in which the wedge element 8 is disposed is hereinafter referred to as "a relay optical axis RA".

The wedge element 8 has, as shown in an upper part of FIG. 1, an entrance surface 8a and an exit surface 8b which are two planar surfaces having mutually different angles with respect to the relay optical axis RA in a plane (xz plane) including the normal to the modulation surface of the DMD 6 (that is, to the illumination surface) and the relay optical axis RA. Light rays entering the wedge element 8 are refracted at its two planar surfaces (entrance and exit surfaces 8a and 8b) having the mutually different angles, so that their traveling angles with respect to the relay optical axis RA are changed from those before their entrance thereto.

On the other hand, in a yz plane shown in a lower part of FIG. 1 and orthogonal to the xz plane, the two planar surfaces (entrance and exit surfaces 8a and 8b) of the wedge element 8 are arranged so as to be orthogonal to the relay optical axis RA. That is, the wedge element 8 is a mere parallel plate in the yz plane. Therefore, the wedge element 8 has, only in the xz plane, an effect of changing an imaging magnification.

Figure 2A:
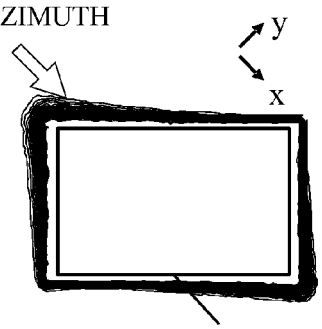
FIGS. 2A to 2C show a distortion correction effect on an illumination area in an illumination optical system of the image projection apparatus of Embodiment 1.

FIG. 2A shows an illumination area when the wedge element 8 is not provided in the relay optical system 5. In FIG. 2A, the illumination area is distorted in the 45-degree azimuth that is an incidence azimuth of the illumination light and thereby has a rhomboidal distorted shape. A black frame in FIG. 1 shows the modulation area of the DMD 6. The distortion of the illumination area is generated in the 45-degree azimuth with respect to the modulation area and defocus is also generated, so that especially a sharpness of corners in the 45-degree azimuth of the illumination area decreases. Thus, an illuminance at portions nearby the corners of the illumination area significantly decreases. If such a decreased illuminance portion overlaps the modulation area of the DMD 6, a brightness evenness of a projected image is deteriorated. As a result, the utilization efficiency of the light from the light source 1 is decreased and thereby the brightness of the projected image is lowered.

Figure 2B:
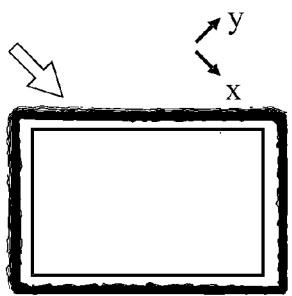

FIG. 2B shows an illumination area whose rhomboidal distortion is corrected, not by providing the wedge element 8 but by, as in the conventional method, rotating and decentering one of the lenses 5a to 5d in the relay optical system 5 with respect to the relay optical axis RA. Although in FIG. 2B the rhomboidal distortion is decreased as compared with FIG. 2A, an influence of eccentric aberration generated due to the rotation and decentering of the lens decreases the sharpness of an outer edge portion of the illumination area, which makes it necessary to increase the margin of the illumination area for the modulation area to some extent.

Figure 2C:
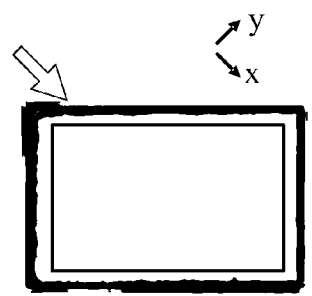

In contrast, FIG. 2C shows an illumination area whose rhomboidal distortion is corrected by, as in this embodiment, providing the wedge element 8 in the relay optical system 5. As shown in FIG. 2C, the image magnification change effect (that is, a magnification correction effect) of the wedge element 8 only in the xz plane enables formation of an illumination area having almost no distortion, in other words, having an approximately similar shape to the rectangular shape of the modulation area of the DMD 6. Furthermore, as understood from a comparison of FIG. 2C with FIG. 2B, the sharpness of the outer edge portion of the illumination area is improved. This sharpness improvement is because providing the wedge element 8 without rotating and decentering the lens causes no new eccentric aberration deteriorating imaging performance. The sharpness improvement shown in FIG. 2C provides a larger margin of the illumination area as compared with FIG. 2B. Consequently, setting the margin to a size equivalent to that shown in FIG. 2B results in increasing a light quantity usable for image projection.

Figure 3A:
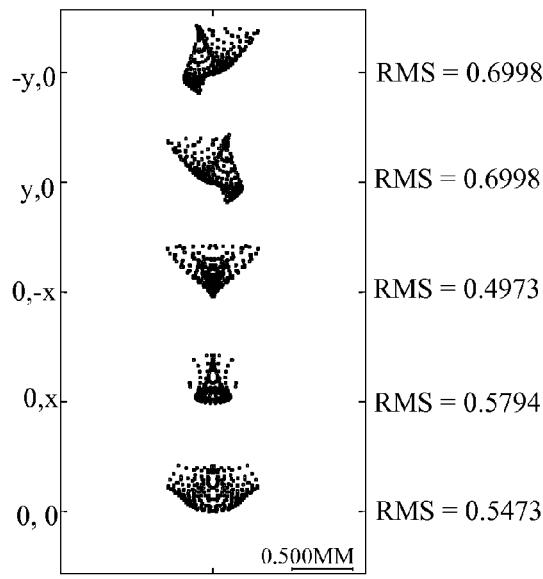
FIGS. 3A and 3B show a difference between Embodiment 1 and a prior art.
Figure 3B:
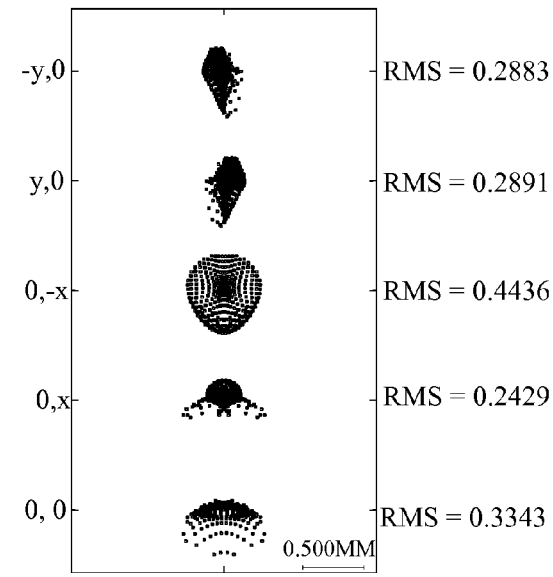

FIG. 3A shows a spot diagram in the case of correcting the rhomboidal distortion of the illumination area by rotating and decentering the lens in the relay optical system 5 with respect to the relay optical axis RA. In FIG. 3A, "0,0", "0,x", "0,-x", "y,0" and "-y,0" show xy coordinates (image heights) on the illumination surface, and RMS represents Root Mean Square; a smaller value of RMS indicates a higher spot convergence. FIG. 3B shows a spot diagram in the case of correcting the rhomboidal distortion of the illumination area by providing the wedge element 8 in the relay optical system 5 as in this embodiment. FIG. 3B shows that the spot convergence is higher as compared with FIG. 3A. In other words, providing the wedge element 8 in the relay optical system 5 enables forming an illumination area with a high sharpness as shown in FIG. 2C.

As described above, this embodiment providing the wedge element 8 in the relay optical system 5 enables sufficiently correcting the rhomboidal distortion of the illumination area and improving the sharpness of the entire illumination area including its outer edge portion. Accordingly, this embodiment enables eliminating a necessity of increasing the margin of the illumination area, which makes it possible to achieve an illumination optical system providing a higher light utilization efficiency.

Although FIG. 1 showed the case where the wedge element 8 is disposed between the lenses 5b and 5c in the relay optical system 5, the wedge element 8 can provide the distortion correction effect even when disposed at any position between the exit surface of the first optical system α (that is, of the rod integrator 4) and DMD 6. However, as shown in FIG. 1, disposing the wedge element 8 at a position (including a vicinity thereof) where a discharge arc image (light source image) of the discharge arc tube as the light source 1 in the relay optical system 5 is formed, that is, between the lenses 5b and 5c further improves the sharpness of the outer edge portion of the illumination area, which is desirable.

In the illumination optical system of this embodiment, a secondary light source image is formed at the entrance surface of the rod integrator 4, and, furthermore, a tertiary light source image is formed between the lenses 5b and 5c in the relay optical system 5. In the following description, a surface on which this tertiary light source image is formed is referred to as "a tertiary light source image surface".

Figures 4A, 4B:
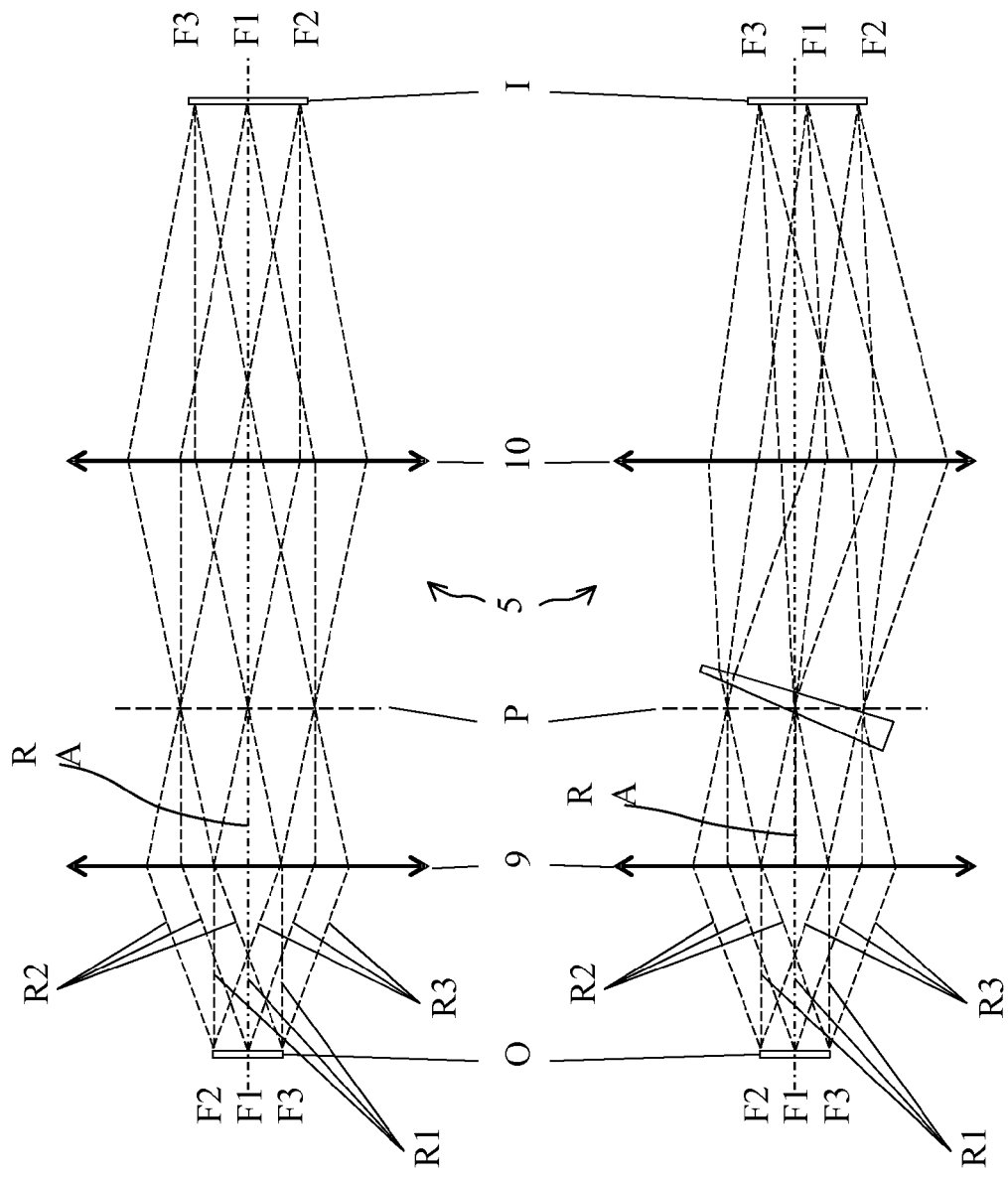
FIGS. 4A and 4B show a modified example of the illumination optical system of Embodiment 1.

Description will be made of a reason why the provision of the wedge element 8 at the tertiary light source image surface enables correcting the rhomboidal distortion of the illumination area and improving the sharpness of the outer edge portion of the illumination area. First, FIGS. 4A and 4B show imaging relations when the exit surface of the rod integrator 4 is defined as an object surface O and the modulation surface of the DMD 6 is defined as an image surface I. FIG. 4A shows an imaging relation when the wedge element 8 is not disposed in the relay optical system 5, and FIG. 4B shows an imaging relation when the wedge element 8 is disposed in the relay optical system 5. A principal ray R1, a upper ray R2 and a lower ray R3 each emitted from a central point (central field angle) F1 of the object surface O are made mutually parallel by elements 9 and 10 each having a positive optical power.

The element 9 corresponds to the lens 5b in FIG. 1, and the element 10 corresponds to the lenses 5c and 5d. Rays R1, R2 and R3 emitted from each of two marginal points (marginal field angles) F2 and F3 which are located at mutually opposite positions across the central point F1 on the object surface O are also made mutually parallel between the elements 9 and 10.

A position P where the mutually parallel rays with the same numerals (R1, R2 or R3) emitted from these points F1, F2 and F3 mutually intersect corresponds to the tertiary light source image surface.

The rays R1 from the central and marginal points F1, F2 and F3, the rays R2 from the central and marginal points F1, F2 and F3 and the rays R3 from the central and marginal points F1, F2 and F3 respectively become mutually parallel rays whose angles are mutually different at the tertiary light source image surface P. This relation means that the ray from each point showing position information at the object surface O is optically converted into angle information at the tertiary light source image surface P. In other words, as a distance on the object surface O from the central point F1 to the marginal point (F2 or F3) increases, the rays R1, R2 and R3 from that marginal point become mutually parallel rays whose angles with respect to the rays R1, R2 and R3 from the central point F1 become larger at the tertiary light source image surface P.

As shown in FIG. 4B, the wedge element 8 disposed at the tertiary light source image surface P changes traveling directions (angles) of the rays R1 from the points F1, F2 and F3 on the object surface O while maintaining them as the mutually parallel rays. This applies respectively to the rays R2 and the rays R3 from the points F1, F2 and F3. Thus, angles formed between the respective mutually parallel rays from the points F1, F2 and F3 are changed.

As described above, at the tertiary light source image surface P, the position information on object surface O is optically changed into the angle information. Therefore, the change of the angles formed between the mutually parallel rays from the points F1, F2 and F3 changes position information on the image surface I. Specifically, deviation angles of the mutually parallel rays emitted from the marginal point F2 and entering the wedge element 8 become closer to a condition of a minimum deviation angle (the deviation angle is a ray refracting angle) as compared with the mutually parallel rays emitted from the marginal point F3 and entering the wedge element 8. Therefore, the deviation angle of the mutually parallel rays emitted from the marginal point F3 and entering the wedge element 8 becomes larger than that of the mutually parallel rays emitted from the marginal point F2 and entering the wedge element 8. Thus, the imaging magnification can be changed only in the xz plane shown in the upper part of FIG. 1 in which the two planar surfaces of the wedge element 8 having the mutually different angles with respect to the relay optical axis RA are provided, which makes it possible to correct the rhomboidal distortion of the illumination area.

In addition, the wedge element 8 disposed in the relay optical system 5 changes the traveling directions of the mutually parallel rays emitted from each point on the object surface O and thereby changes only the position information on the image surface I. Therefore, an influence of the wedge element 8 on ray convergence, that is, aberration at the image surface I can be suppressed to be extremely small.

Figure 5A:
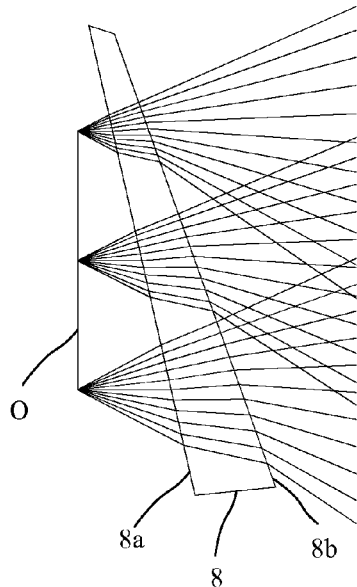
FIGS. 5A and 5B show a reason for a difference of the distortion correction effect depending on a position of a light-transmissive element in the illumination optical system.
Figure 5B:
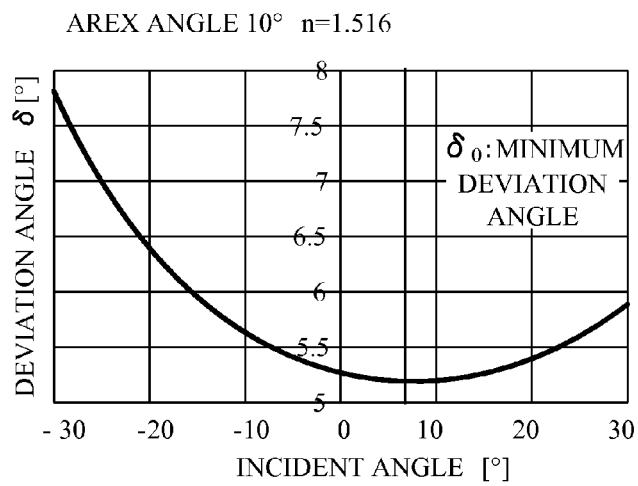

On the other hand, FIG. 5A shows a case where the wedge element 8 is disposed between the object surface (exit surface of the rod integrator 4) O and the element 9. Rays R1, R2 and R3 emitted from each point on the object surface O are divergent rays, and the wedge element 8 is disposed in the divergent rays. The wedge element 8 is a kind of prism and has a characteristic of changing a deviation angle for a ray entering it depending on an incident angle of the ray. FIG. 5B shows a relation between the incident angle and the deviation angle in a prism equivalent to the wedge element 8. The deviation angle significantly changes depending on the incident angle with a minimum deviation angle $\delta_0$ as a minimum value. Thus, the prism is an element having a large dispersion of the deviation angle for the incident angle.

Therefore, the wedge element 8 disposed in the divergent rays provides mutually significantly different deviation angles to the principal ray, upper ray and lower rays from each point on the object surface O. In FIG. 5B, the deviation angle of the upper ray whose incident angle is small is near the minimum deviation angle $\delta_0$ of the prism, but the deviation angle of each of the principal ray and the lower ray gradually increases. This increase of the deviation angle makes comatic aberration more likely to be generated, which makes the sharpness of the outer edge portion of the illumination area more likely to be decreased as compared with the case where the wedge element 8 is disposed at the tertiary light source image surface P.

From the above reason, the wedge element 8 disposed at the tertiary light source image surface P enables suppressing generation of new aberration caused by the wedge element 8 itself, thereby enabling further improving the sharpness of the outer edge portion of the illumination area.

In other words, it is desirable to dispose the wedge element 8 such that, in the section (xz section) parallel to a normal to the entrance surface of the wedge element 8, the wedge element 8 intersects with the tertiary light source image surface P.

Figure 6A:
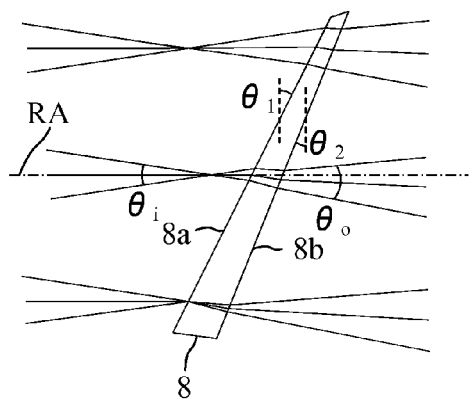
FIGS. 6A and 6B show a condition on the light-transmissive element.

Description will be made of a desirable shape of the wedge element 8 in this embodiment. As described above, the wedge element 8 has the entrance and exit surfaces 8a and 8b which are two planar surface having mutually different angles with respect to the relay optical axis RA. It is desirable that tilt directions of the entrance and exit surfaces 8a and 8b with respect to the relay optical axis RA be mutually identical. The angles of the entrance and exit surfaces 8a and 8b whose tilt directions with respect to the relay optical axis RA are mutually identical are respectively represented by $\theta_1$ and $\theta_2$. Specifically, as shown in FIG. 6A, the angle $\theta_1$ is an angle formed by the entrance surface 8a of the wedge element 8 and an axis intersecting with the entrance surface 8a of the wedge element 8 and being orthogonal to the relay optical axis RA. Similarly, the angle $\theta_2$ is an angle formed by the exit surface 8b of the wedge element 8 and an axis intersecting with the exit surface 8b of the wedge element 8 and being orthogonal to the relay optical axis RA. With these definitions, it is desirable that $\theta_1$ and $\theta_2$ satisfy the following condition:

$$\theta_1 > \theta_2 \qquad (1)$$

The wedge element 8 disposed at the above-described tertiary light source image surface P enables, by its entrance and exit surfaces 8a and 8b satisfying the condition (1), more surely correcting the rhomboidal distortion of the illumination area. The reason therefore will be described below.

In order to correct the rhomboidal distortion of the illumination area, it is necessary to correct, in a section in which the apparent magnification on the illumination surface where the illumination light obliquely reaches increases, the magnification so as to reduce it. As described with reference to FIG. 4A, on the tertiary light source image surface P, the rays R1, R2 and R3 from each point, each of which expresses the position information on the object surface O, are changed into the angle information. Thus, as the distance on the object surface O from the central point F1 to the marginal point (F2 or F3) increases, the rays R1, R2 and R3 from that marginal point become mutually parallel rays whose angles with respect to the rays (mutually parallel rays) from the central point F1 becomes larger at the tertiary light source image surface P. Therefore, in order to provide, to the wedge element 8 disposed at the tertiary light source image surface P, an effect of reducing the magnification, it is necessary to set the shape of the wedge element 8 such that the mutually parallel rays from each point on the tertiary light source image surface P form small angles with respect to one another.

Figure 6B:
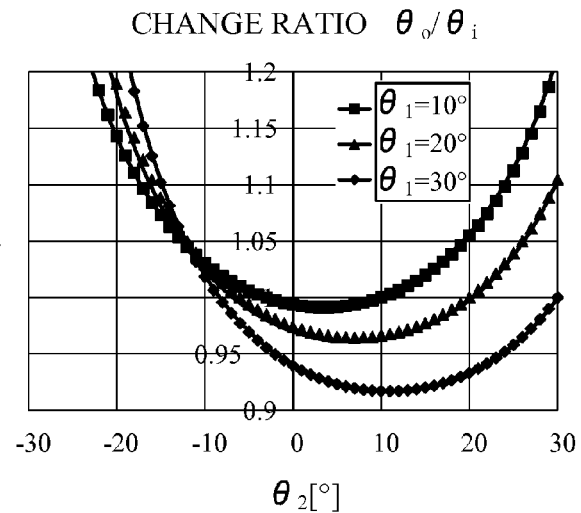

FIG. 6A shows changes of the angles formed by the mutually parallel rays transmitted through the wedge element 8 with respect to one another. In FIG. 6A, an angle (before the change) formed on the tertiary light source image surface P by the mutually parallel rays from the two marginal points across the central point and equally distant from the central point on the object surface O is represented by $\theta_i$, and an angle (after the change) formed by these mutually parallel rays transmitted through the wedge element 8 disposed at the tertiary light source image surface P is represented by $\theta_o$. FIG. 6B shows a graph whose horizontal axis represents various angles $\theta_2$ with respect to angles $\theta_1$ of 10 degree, 20 degrees and 30 degrees and whose vertical axis represents a change ratio $\theta_o/\theta_i$ of the angles $\theta_i$ and $\theta_o$ by insertion of the wedge element 8.

In order to provide the magnification reduction effect in the section in which the magnification should be reduced, it is necessary that the insertion of the wedge element 8 make the change ratio $\theta_o/\theta_i$ equal to 1 or less. As understood from the graph of FIG. 6B, the change ratio $\theta_o/\theta_i$ equal to 1 or less is acquired in a range where the condition (1) is satisfied. However, of the range where the condition (1) is satisfied, in a partial range where $\theta_1$ is a positive value and $\theta_2$ is a negative value, that is, where the entrance and exit surfaces 8a and 8b are tilted to mutually opposite directions with respect to the relay optical axis RA, the change ratio $\theta_o/\theta_i$ becomes larger than 1. Therefore, when $\theta_1$ and $\theta_2$ have mutually identical signs (that is, the entrance and exit surfaces 8a and 8b are tilted to mutually identical directions with respect to the relay optical axis RA) and the condition (1) is satisfied, the change ratio $\theta_o/\theta_i$ becomes 1 or less.

Furthermore, it is desirable that the direction to which the wedge element 8 (entrance and exit surfaces 8a and 8b) is tilted with respect to the relay optical axis RA be identical to that to which the normal to the modulation surface (illumination surface) of the DMD 6 is tilted with respect to the relay optical axis RA. Thereby, the sharpness of the outer edge portion of the illumination area is more improved. The reason therefore will be described below.

Figures 7A, 7B:
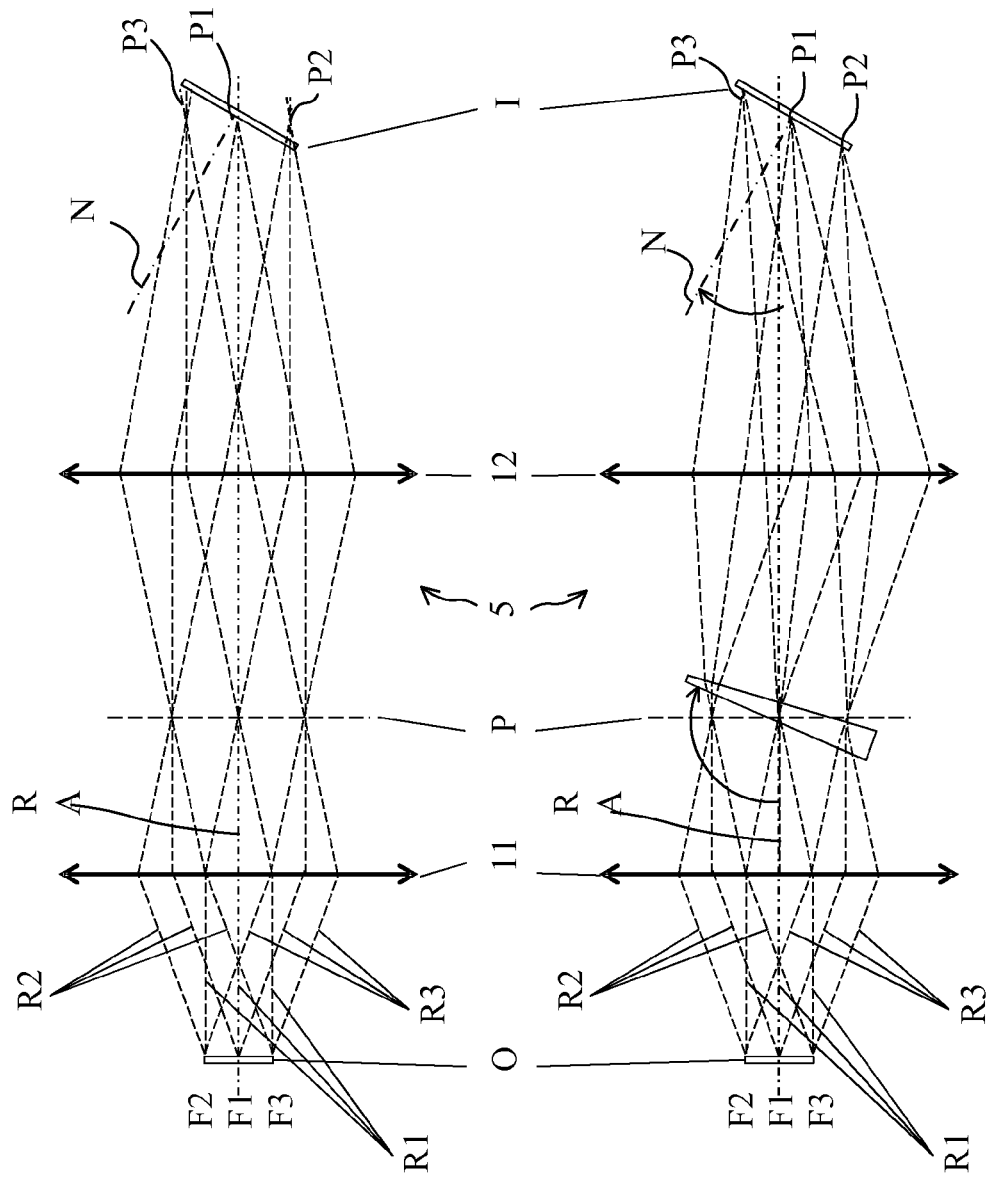
FIGS. 7A and 7B show another modified example of the illumination optical system of Embodiment 1.

FIGS. 7A and 7B show, as FIGS. 4A and 4B, imaging relations when the exit surface of the rod integrator 4 is defined as the object surface O, and the modulation surface of the DMD 6 is defined as the image surface I. A normal N to the image surface I corresponds to the normal to the modulation surface of the DMD6.

FIG. 7A shows an imaging relation in a case where the wedge element 8 is not disposed in the relay optical system 5. In this case, the illumination light obliquely reaches the image surface I with respect to its normal N, so that the image plane I is tilted with respect to the relay optical axis RA. Thereby, though a focal position P1 of the rays R1, R2 and R3 from the central point F1 on the object surface O is located on the image plane I, a focal position P2 of the rays R1, R2 and R3 from the marginal point F2 is shifted backward from the image surface I. Furthermore, a focal position P3 of the rays R1, R2 and R3 from the marginal point F3 is shifted frontward from the image plane I. These focal position shifts generate defocus, which decreases the sharpness of the outer edge portion of the illumination area.

On the other hand, FIG. 7B shows an imaging relation in a case where the wedge element 8 is disposed in the relay optical system 5 and the wedge element 8 is tilted with respect to the relay optical axis RA to an identical direction to that to which the normal N to the image surface I is tilted with respect to the relay optical axis RA. In this case, optical paths of the rays R1, R2 and R3 from the marginal point F2 on the object surface O are farther from the relay optical axis RA as compared with the case where the wedge element 8 is not disposed, and thereby optical path lengths thereof become longer. As a result, the focal position P2 of the rays R1, R2 and R3 from the marginal point F2 becomes closer to the image surface I as compared with the case where the wedge element 8 is not disposed. On the other hand, optical paths of the rays R1, R2 and R3 from the marginal point F3 are closer to the relay optical axis RA as compared with the case where the wedge element 8 is not disposed, and thereby optical path lengths thereof become shorter. As a result, the focal position P3 of the rays R1, R2 and R3 from the marginal position F3 also becomes closer to the image surface I as compared with the case where the wedge element 8 is not disposed.

Thus, the wedge element 8 tilted with respect to the relay optical axis RA to the identical direction to that of the normal N to the modulation surface (illumination surface) of the DMD 6 with respect to the relay optical axis RA enables further improving the sharpness of the outer edge portion of the illumination area.

Specifically, as shown by an arrow in FIG. 7B, the entrance and exit surfaces of the wedge element 8 are tilted to a clockwise direction with reference to the relay optical axis RA; this direction is defined as the tilt direction of the entrance and exit surfaces. Similarly, the normal N to the modulation surface of the DMD 6 is tilted to the clockwise direction with reference to the relay optical axis RA. That is, the tilt direction of the entrance and exit surfaces and that of the normal N are mutually identical.

Instead thereof, an axis orthogonal to the relay optical axis RA may be used as a reference of the tilt direction. In this case, the entrance and exit surfaces of the wedge element 8 are tilted to the clockwise direction with reference to the axis orthogonal to the relay optical axis RA. Similarly, the modulation surface of the DMD 6 is tilted to the clockwise direction with reference to the axis orthogonal to the relay optical axis RA. That is, the tilt direction of the entrance and exit surfaces of the wedge element 8 with respect to the axis orthogonal to the optical axis of the second optical system is identical to that of the illumination surface with respect to axis orthogonal to the optical axis of the second optical system.

Although this embodiment described the case where the DMD is used as the light modulation element, other light modulation elements may be used. Furthermore, although this embodiment described the illumination optical system used for the image projection apparatus, an illumination optical system configured similarly to the illumination optical system of this embodiment can also be used in other apparatuses in order to cause an illumination light from a light source to form an illumination area having a predetermined shape on an illumination surface.

The above-mentioned embodiment can reduce, by using the so-called wedge-shaped light-transmissive element having the planar entrance and exit surfaces, the distortion of the illumination area caused by the illumination light obliquely reaching the illumination surface and can prevent the generation of the defocus and the decrease of the sharpness in the illumination area. This embodiment accordingly enables eliminating the necessity of increasing the margin of the illumination area, which results in improving the light utilization efficiency. Moreover, using this illumination optical system enables realizing an image projection apparatus capable of displaying a bright projected image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-104066, filed on May 20, 2014, which is hereby incorporated by reference wherein in its entirety.

What is claimed is:
1. An illumination optical system comprising:
a first optical system configured to shape a light flux from a light source such that the light flux forms a rectangular shape of an illumination surface on a plurality of micro mirrors;
a second optical system having an optical axis tilted with respect to a normal to the illumination surface and configured to introduce the light flux from the first optical system to the illumination surface; and
a light-transmissive element having an entrance surface receiving a light flux from the first optical system and an exit surface introducing a light flux from the entrance surface to the illumination surface, the entrance surface and the exit surface respectively forming mutually different angles with respect to the optical axis of the second optical system in a first plane including the optical axis of the second optical system and the normal to the illumination surface,
wherein the illumination surface is tilted with respect to the optical axis of the second optical system in a second plane orthogonal to the first plane and including the optical axis of the second optical system, and
wherein the light-transmissive element is disposed between the first optical system and the illumination surface.

2. An illumination optical system according to claim 1, wherein, in the first optical system, a rod integrator is disposed closest to the second optical system.

3. An illumination optical system according to claim 1, wherein the light-transmissive element is disposed in the second optical system.

4. An illumination optical system according to claim 3, wherein the light-transmissive element is disposed in the second optical system at a position where an image of the light source is formed.

5. An illumination optical system according to claim 1, wherein the entrance and exit surfaces of the light-transmissive element are tilted to mutually identical directions with respect to the optical axis of the second optical system, and the following condition is satisfied:

$$\theta 1 > \theta 2$$

where θ1 and θ2 respectively represent an angle of the entrance surface and an angle the exit surface with respect to an axis orthogonal to the optical axis of the second optical system.

6. An illumination optical system according to claim 1, wherein the entrance and exit surfaces of the light-transmissive element are tilted with respect to the optical axis of the second optical system to a direction identical to a direction to which the normal of the illumination surface is tilted with respect to the optical axis of the second optical system.

7. An image projection apparatus comprising:
an illumination optical system; and
a light modulation element disposed at an illumination surface and configured to modulate a light flux introduced from a light source through the illumination optical system, the light modulated by the light modulation element being projected to a projection surface, wherein the illumination optical system comprises:
(1) a first optical system configured to shape the light flux from the light source such that the light flux forms a rectangular shape of the light modulation element;
(2) a second optical system having an optical axis tilted with respect to a normal to the illumination surface and configured to introduce the light flux from the first optical system to the illumination surface; and
(3) a light-transmissive element having an entrance surface receiving a light flux from the first optical system and an exit surface introducing a light flux from the entrance surface to the illumination surface, the entrance surface and the exit surface respectively forming mutually different angles with respect to the optical axis of the second optical system in a first plane including the optical axis of the second optical system and the normal to the illumination surface,
wherein the illumination surface is tilted with respect to the optical axis of the second optical system in a second plane orthogonal to the first plane and including the optical axis of the second optical system, and
wherein the light-transmissive element is disposed between the first optical system and the light modulation element.

8. An image projection apparatus according to claim 7, wherein the light modulation element is a digital micromirror device comprising a plurality of mirrors rotatable so as to tilt with respect to a modulation surface of the light modulation element, and
wherein the optical axis of the second optical system is tilted with respect to the normal to the modulation surface.

* * * * *